(12) United States Patent
Mikami (10) Patent No.: US 6,724,988 B2
(45) Date of Patent: Apr. 20, 2004

(54) LENS-FITTED PHOTO FILM UNIT HAVING APERTURE STOP DEVICE

(75) Inventor: Yuji Mikami, Minami-Ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/323,881

(22) Filed: Dec. 20, 2002

(65) Prior Publication Data

US 2003/0118337 A1 Jun. 26, 2003

(30) Foreign Application Priority Data

Dec. 26, 2001 (JP) ......................... 2001-393353

(51) Int. Cl.$^7$ ............................................. G03B 15/05

(52) U.S. Cl. ...................... 396/161; 396/170; 396/179; 396/276; 396/475

(58) Field of Search ................................. 396/170, 161, 396/171, 179, 276, 475, 166, 167

(56) References Cited

U.S. PATENT DOCUMENTS 6,442,343 B2 * 8/2002 Kameyama et al. .......... 396/65

* cited by examiner

Primary Examiner—W. B. Perkey
(74) Attorney, Agent, or Firm—Young & Thompson (57) ABSTRACT

A lens-fitted photo film unit is pre-loaded with photo film. A photometric circuit measures object brightness of a photographic object, and determines which of high brightness or low brightness the object brightness is according to comparison with a predetermined reference brightness level. A mode selector in a button shape sets a selected one of an AE mode and a night scene mode. A combination of stationary and movable aperture stop plates changes over a photographic light path in a selected one of small, middle and large aperture stop states. The movable aperture stop plates set the light path in the small aperture stop state when the AE mode is determined and also upon detection of the high brightness. The light path is set in the middle aperture stop state when the AE mode is determined and also upon detection of the low brightness. The light path is set in the large aperture stop state when the night scene mode is determined.

16 Claims, 6 Drawing Sheets

LENS-FITTED PHOTO FILM UNIT HAVING APERTURE STOP DEVICE

BACKGROUND OF THE INVENTION

1. Field of the Invention

The present invention relates to a lens-fitted photo film unit having an aperture stop device. More particularly, the present invention relates to a lens-fitted photo film unit having an aperture stop device, in which an aperture stop can be changed over easily and exactly, and which has a simplified structure.

2. Description Related to the Prior Art

There is a lens-fitted photo film unit pre-loaded with unexposed photo film as a single-use camera. A type of the lens-fitted photo film unit accommodates a flash device, which enables an exposure even in a room or a place with weak ambient light, for example at night. The lens-fitted photo film unit has a simple shutter mechanism, simple photo film winding mechanism and the like which can remarkably lower the cost of the lens-fitted photo film unit. The lens-fitted photo film unit is widely used because of easy handling and availability.

The widely used type of the lens-fitted photo film unit has a fixed aperture stop and a fixed shutter speed. There is no control of an exposure in consideration of object brightness. However, the accommodated negative photo film has sufficient latitude, which can result in producing photographic prints with acceptably high image quality in view of ordinarily photographed scene without extreme patterns of object light.

Furthermore, there is a known type of the lens-fitted photo film unit with a mechanism for changing over the aperture stop stepwise according to turning on and off of emission of flash light. Specifically, the aperture stop is changed over to a larger aperture stop state if the flash emission is turned on. Note that an f-number of the optical system is smaller when the larger aperture stop is set. So a background object behind a principal object is photographed at an adequate exposure amount in spite of lack of reach of the flash light to the background object. The principal object is reliably illuminated by the flash light, and as a result, can be reproduced at a suitable density together with the background object.

However, there are numerous conditions in scenes and objects that users wish to photograph. The two-step changeable type of the aperture stop and the sufficient latitude of the photo film cannot be utilized for agreeably taking a photographic object under a certain condition. For example, an underexposure may occur in photographing a scene, which cannot be recorded by any means acceptably in known types of the lens-fitted photo film unit. It may be conceivable to raise the number of the steps at which the aperture stop is changeable. However, there occurs a problem of higher difficulty in the manual operation of a user, because he or she is obliged to determine a suitable one of the plural steps of the aperture stop. Also, it may be conceivable to automate the changes of the aperture stop according to changes in object brightness. However, a selector mechanism for this purpose must be incorporated, and raise the manufacturing cost of the product. This is inconsistent to the easy availability of the lens-fitted photo film unit.

SUMMARY OF THE INVENTION

In view of the foregoing problems, an object of the present invention is to provide a lens-fitted photo film unit having an aperture stop device, in which an aperture stop can be changed over easily and exactly, and which has a simplified structure.

In order to achieve the above and other objects and advantages of this invention, a lens-fitted photo film unit pre-loaded with photo film is provided, in which a photometric circuit measures object brightness of a photographic object, and determines which of high brightness and low brightness the object brightness is according to comparison with a predetermined reference brightness level. A mode selector determines a selected one of an AE mode and a night scene mode. An aperture stop device changes over a photographic light path in a selected one of a small aperture stop state, a middle aperture stop state, and a large aperture stop state, the middle aperture stop state having a greater aperture diameter than the small aperture stop state, the large aperture stop state having a greater aperture diameter than the middle aperture stop state, wherein the aperture stop device sets the light path in the small aperture stop state when the AE mode is determined and also when the object brightness is the high brightness, sets the light path in the middle aperture stop state when the AE mode is determined and also when the object brightness is the low brightness, and sets the light path in the large aperture stop state when the night scene mode is determined.

Furthermore, a flash device is driven when the night mode is determined, for applying flash light to the object.

Furthermore, a shutter mechanism is settable at a selected one of high and low shutter speeds, for providing the photo film with an exposure by opening and shutting the light path. A shutter speed changer sets the shutter mechanism at the high shutter speed when the AE mode is determined, and sets the shutter mechanism at the low shutter speed when the night scene mode is determined.

The aperture stop device includes a stationary aperture stop plate, disposed in a stationary manner, having a large aperture stop opening in the light path, for defining the large aperture stop state. At least one movable aperture stop plate has a middle aperture stop opening and a small aperture stop opening, the middle aperture stop opening being smaller than the large aperture stop opening, the small aperture stop opening being smaller than the middle aperture stop opening, wherein the movable aperture stop plate defines the large aperture stop state when set away from the light path, and the middle and small aperture stop openings define respectively the middle and small aperture stop states when set in the light path.

The aperture stop device sets the light path in the small aperture stop state when the night scene mode is determined and also when the object brightness is the high brightness, and sets the light path in the large aperture stop state when the night scene mode is determined and also when the object brightness is the low brightness.

Furthermore, a flash switch is externally operable, for turning on the flash device when rendered conductive, and for turning off the flash device when rendered non-conductive. A lock mechanism is actuated when the night scene mode is determined, for keeping the flash switch conductive by locking, so as to inhibit the flash switch from being non-conductive.

Furthermore, a flash adjusting unit changes over flash light of the flash device at a selected one of at least a high light amount and a low light amount, the high light amount being obtained by full flash emission of the flash device, the low light amount being obtained by restricting flash emission of the flash device according to reflected flash light from the object.

In a preferred embodiment, the aperture stop device includes a stationary aperture stop plate, disposed in a stationary manner, having a large aperture stop opening in the light path, for defining the large aperture stop state. A middle aperture stop plate has a middle aperture stop opening with a smaller aperture diameter than the large aperture stop opening, movable between first and second positions, wherein the middle aperture stop plate, when in the first position, sets the middle aperture stop opening in the light path to define the middle aperture stop state, and when in the second position, is away from the light path. A small aperture stop plate has a small aperture stop opening with a smaller aperture diameter than the middle aperture stop opening, movable between third and fourth positions, wherein the small aperture stop plate, when in the third position, sets the small aperture stop opening in the light path to define the small aperture stop state, and when in the fourth position, is away from the light Path.

The AE mode and the night scene mode are determined by shifting the mode selector in respectively the AE position and the night scene position. The aperture stop device further includes a middle aperture stop transmission mechanism for shifting the middle aperture stop plate to the first position when the mode selector is in the AE position, and for shifting the middle aperture stop plate to the second position when the mode selector is in the night scene position. A small aperture stop setting mechanism shifts the small aperture stop plate to the third position when the object brightness is the high brightness, and shifts the small aperture stop plate to the fourth position when the object brightness is the low brightness.

The small aperture stop setting mechanism includes an actuator.

Furthermore, a flash button portion is movable between on and off positions, for rendering the flash switch conductive when in the on position, and for rendering the flash switch non-conductive when in the off position. The mode selector includes a mode button portion movable on an orbit extending along a moving orbit of the flash button portion, and movable between an AE position representing the AE mode and a night scene position representing the night scene mode. The lock mechanism is a lock projection, disposed to project from the mode button portion, for retaining an end part of the flash button portion near to the off position when the mode button portion is set in the night scene position, to set the flash button portion forcibly in the on position, the flash button portion being inhibited from coming back to the off position.

The flash adjusting unit determines the high light amount when the small aperture stop state is set, determines a middle light amount when the middle aperture stop state is set, and determines the low light amount when the large aperture stop state is set, so as to prevent overexposure in the middle and large aperture stop states.

The flash adjusting unit includes a flash adjustment photo sensor for detecting the reflected flash light from the object. A light amount integration circuit obtains an integrated light amount by integration of a signal of the reflected flash light. A quench circuit is enabled in response to a signal of the low brightness from the photometric circuit, for quenching the flash emission of the flash device when the integrated light amount comes up to a reference value of the middle or low light amount, the quench circuit being disabled in response to a signal of the high brightness from the photometric circuit, to determine the high light amount.

The flash adjusting unit further includes a light amount selector, shifted by changing over of the mode selector, for selecting the low light amount when the night scene mode is determined, and for selecting the middle light amount when the AE mode is determined.

The light amount selector includes a light reducing filter, offset from the light adjustment photo sensor when the night scene-mode is determined, and set in front of the light adjustment photo sensor when the AE mode is determined, for weakening the reflected flash light being detected, to slow a rise in the integrated light amount, the flash emission of the flash device being continued until the flash light increases up to the middle light amount higher than the low light amount.

The mode selector has a movable plate, and the light reducing filter is secured fixedly on the movable plate.

The shutter mechanism includes a shutter opening for defining the light path. A shutter blade is movable pivotally in a shut position and first and second open positions, for shutting the shutter opening when in the shut position, and for opening the shutter opening when in the first and second open positions, the second open position being disposed between the shut position and the first open position. A shutter blade driving unit moves the shutter blade pivotally from the shut position toward the first open position, and then back to the shut position. The shutter speed changer includes a movable stopper, movable between an offset position and a blocking position, set away from the moving path of the shutter blade when in the offset position, for enabling the shutter blade to reach the first open position, to determine the low shutter sped, the movable stopper extending into the moving path of the shutter blade when in the blocking position, for disabling the shutter blade from moving beyond the second open position toward the first open position, to determine the high shutter speed by shortening time for backward movement. A transmission mechanism sets the movable stopper in the offset position when the night scene mode is determined in the mode selector, and sets the movable stopper in the blocking position when the AE mode is determined.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
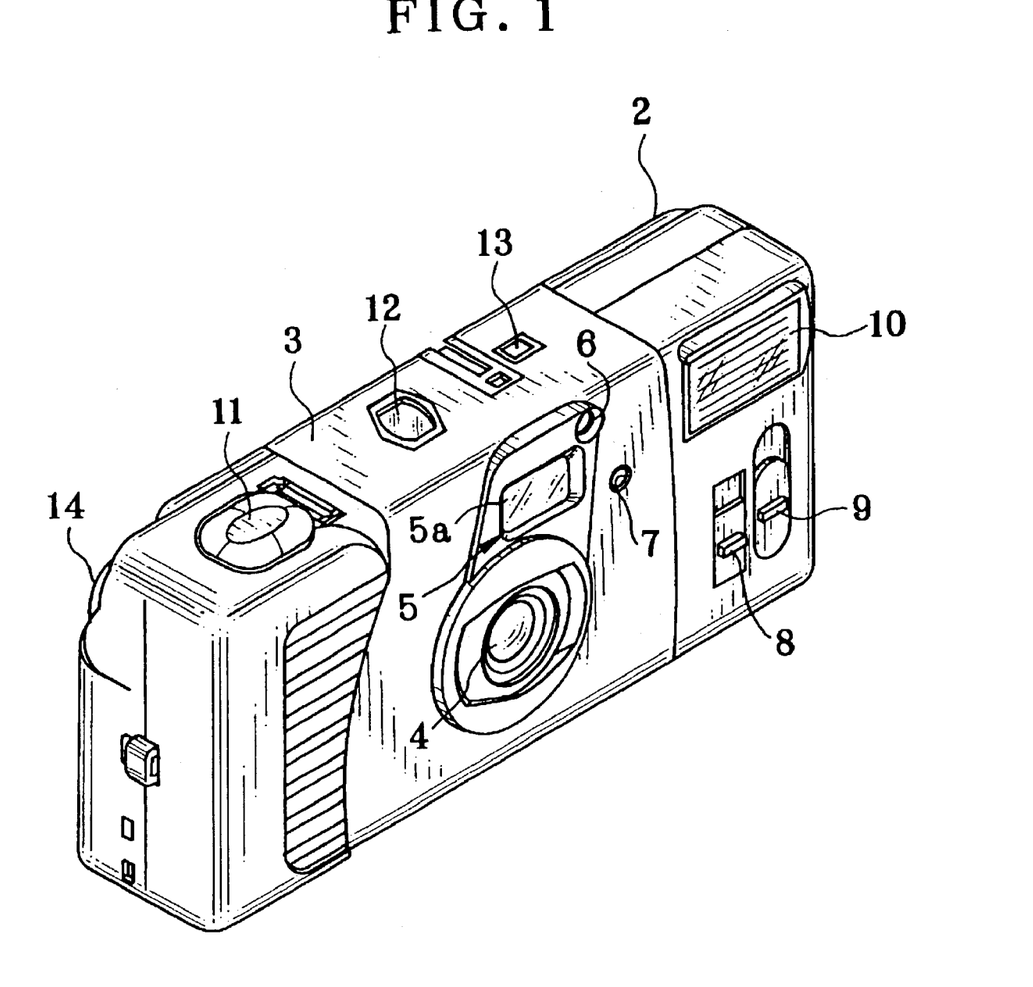
FIG. 1 is a perspective illustrating a lens-fitted photo film unit of the invention.

In FIG. 1, a lens-fitted photo film unit is illustrated, and includes a photo film housing 2 and a sticker belt 3 for covering a central portion of the photo film housing 2. The photo film housing 2 has various elements incorporated therein, which are a shutter mechanism, an aperture stop device, a photo film feeding mechanism, a flash device and the like. A photo film 60 of FIG. 2 wound in a roll form is contained in the photo film housing 2. A photo film cassette is contained in the photo film housing 2 for accommodation of the photo film 60 after being exposed frame by frame.

A front portion of the photo film housing 2 has a taking lens 4, an objective window 5a of a viewfinder 5, an AE photometric window 6, a flash adjustment window 7, a mode selector 8 having a mode button portion, an externally operable flash button portion 9 and a flash emitter 10 in the flash device. An upper portion of the photo film housing 2 has a shutter release button 11, a frame counter window 12 and a standby indicator 13. The frame counter window 12 indicates the number of remaining available frames. The standby indicator 13 indicates a state ready for flash emission after charging.

A winder wheel 14 is positioned in the photo film housing 2, has a portion uncovered on the rear side, and is rotated manually at each time of exposing one frame. A viewfinder eyepiece window (not shown) is formed in the photo film housing 2 and positioned directly behind the objective window 5a. The sticker belt 3 is attached to the photo film housing 2 with adhesive agent, and has various openings through which the taking lens 4, the viewfinder 5, the frame counter window 12 and the like appear externally.

There is an AE photo sensor 17 or photo receptor, disposed inside the AE photometric window 6, for measuring object brightness. See FIG. 3. There is a flash adjustment photo sensor 18 in a flash adjusting unit, disposed inside the flash adjustment window 7, for detecting reflected flash light reflected by a photographic object. See FIG. 2.

The mode selector 8 is operated for designating a desired one of an AE mode and night scene mode, which will be described in detail. The mode selector 8 is slidable between an AE position of FIGS. 1 and 2A, and a night scene position that is higher than the AE position. The flash button portion 9 is operated for turning on or off the flash device in taking an exposure, and is slidable between an off position of FIGS. 1 and 2A, and an on position that is higher than the off position.

When the mode selector 8 is slid to the night scene mode, the flash button portion 9 is slid to its on position responsively. When the flash button portion 9 is slid to the off position, the mode selector 8 is slid to its position of the AE mode responsively. Note that the flash button portion 9 is settable to the on and off positions as desired while the AE mode is designated.

The AE mode can be used for a scene with lighting of the inside of a room with ambient light at a comparably great amount, and also for a outdoor scene with daylight. The AE photo sensor 17 measures object-brightness of a photographic object. In the AE mode, the aperture stop is automatically set in one of a small aperture stop state and a middle aperture stop state according to the object brightness. If the object brightness is equal to or higher than a reference brightness level, the small aperture stop state is used. In other words, the f-number is set high. If the object brightness is lower than the reference brightness level, the middle aperture stop state is used at a greater aperture diameter than the small aperture stop state. At this time, the f-number is set lower. In the AE mode, a first shutter speed is used irrespective of the object brightness.

The night scene mode is used typically for taking a photograph in an outdoor scene at night, an indoor scene with insufficient ambient light, for example a scene in a party room or various rooms specifically for a banquet, wedding, dancing, and the like. When the night scene mode is selected, the lens-fitted photo-film unit is set in a large aperture stop state and at a second shutter speed. The large aperture stop state is defined by setting of an aperture diameter greater than that of the middle aperture stop state. The second shutter speed is lower than the first shutter speed. Also, the flash device is forcibly driven while the night scene mode is used. As has been described, the flash button portion 9 is set in the on position by positioning of the mode selector 8, to cause the flash device to operate for emitting flash light. If the object brightness is equal to or higher than a reference level at the time of the night scene mode, the light path is set in the small aperture stop state in a manner similar to the AE mode, for the purpose of avoiding an overexposure as failure of photographing.

Note that a term of high-brightness AE mode is hereinafter used for a combination of the AE mode and the use of the small aperture stop state. A term of low-brightness AE mode is used for a combination of the AE mode and the use of the middle aperture stop state. A term of normal night scene mode is used for a combination of the night scene mode, the second shutter speed, and the large aperture stop state. A term of corrected night scene mode is used for a combination of the night scene mode, the second shutter speed, and the small aperture stop state.

The flash device is an automatic flash adjustment type. The flash emitter 10 emits flash light toward a photographic object. The flash device is operable in two modes that are a flash adjusting mode for the automatic flash adjustment, and a full flash emitting mode without automatic flash adjustment. If the object brightness is lower than the reference level, the flash adjusting mode is designated. This is in the combination of the low brightness and the AE mode, and in the combination of the night scene mode and a normal state with low brightness. In the flash adjusting mode, the flash adjustment photo sensor 18 receives reflected flash light. A flash light amount is obtained by integration according to the received flash light. Thus, the flash light amount is controlled to optimize an exposure amount due to the flash light.

On the other hand, a full flash emitting mode is set if the object brightness is equal to or higher than the reference brightness level. This is either one of the high-brightness AE mode and the corrected night scene mode. In the full flash emitting mode, the flash device fully emits flash toward a photographic object, at a maximum flash light amount.

Figure 2:
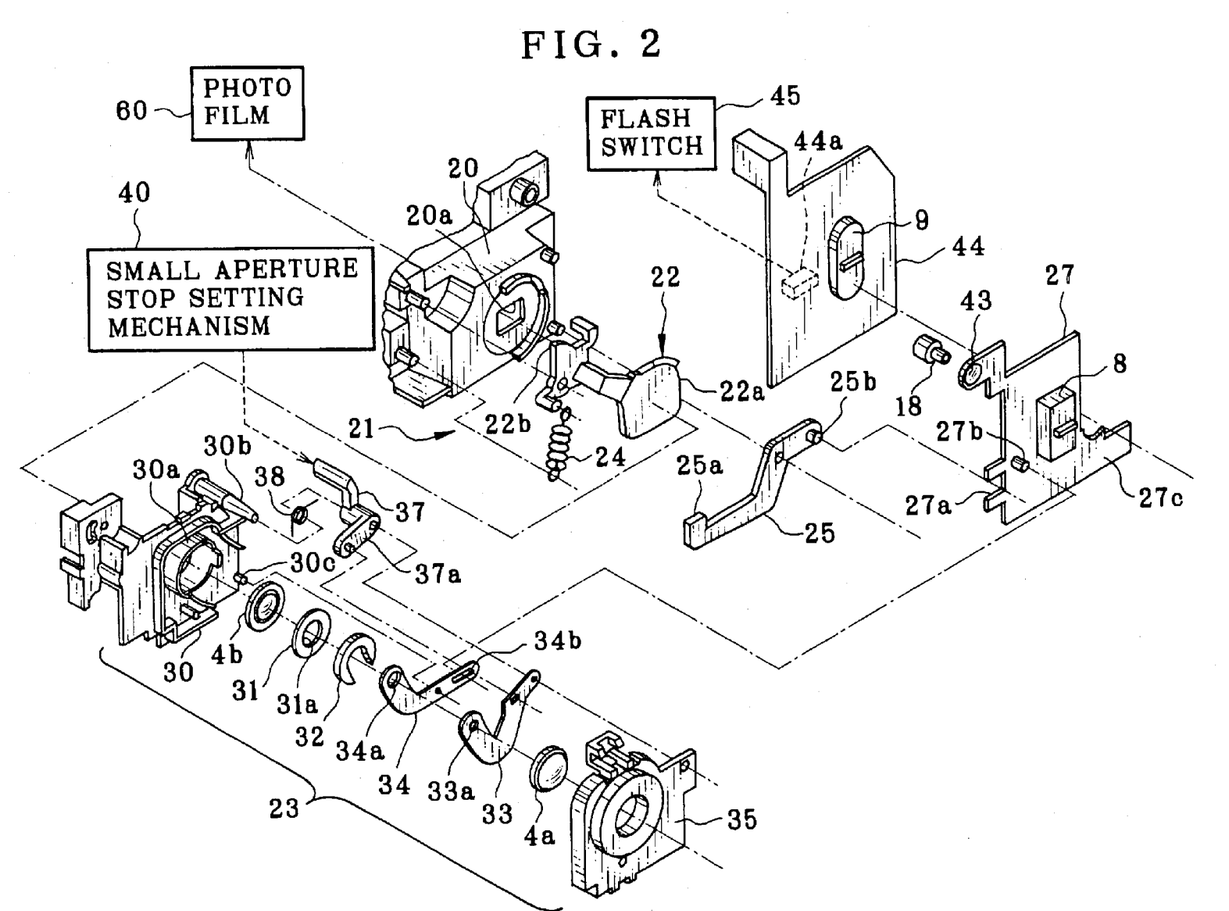
FIG. 2 is an exploded perspective illustrating structures for changing over an aperture stop and shutter speed.
Figure 2A:
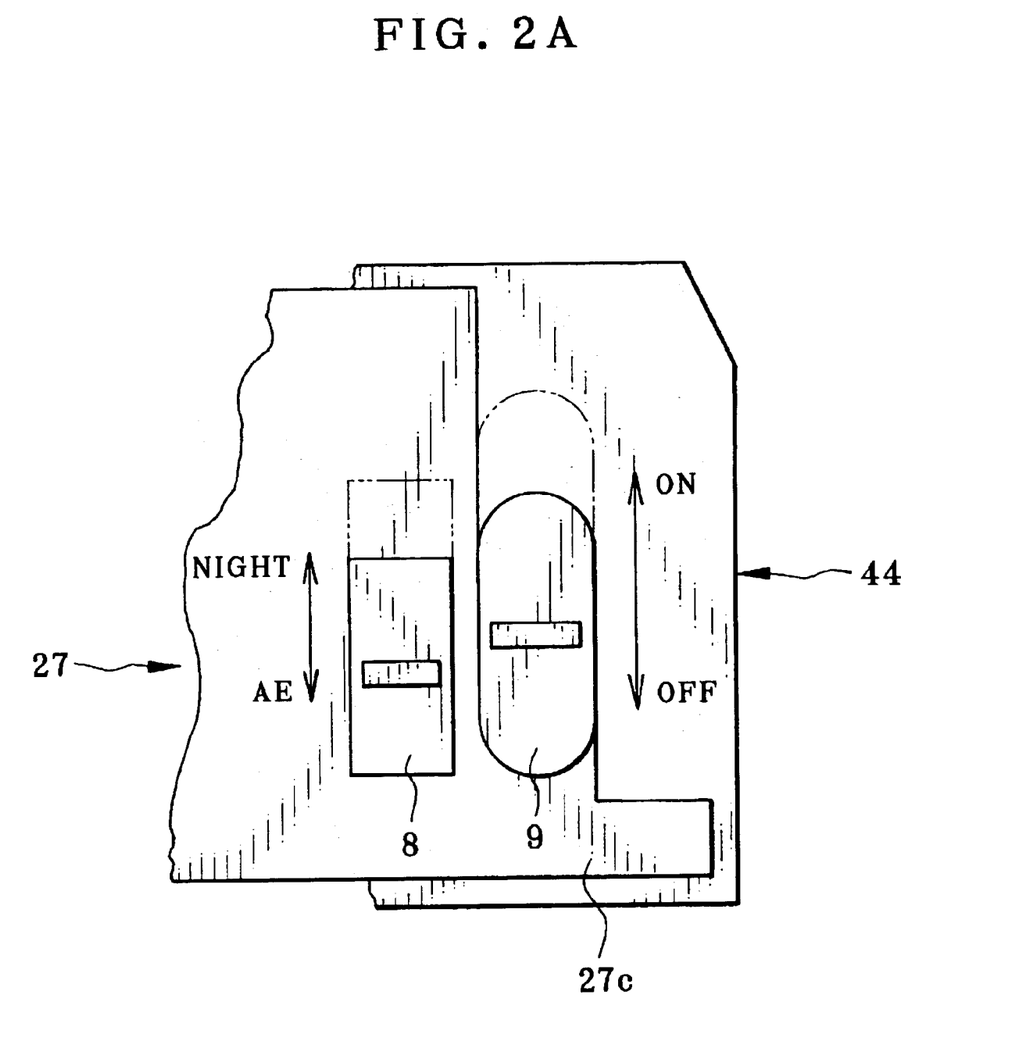
FIG. 2A is an explanatory view in front elevation, illustrating a mode selector of which a lock projection is locked by an externally operable flash button portion.
Figure 2B:
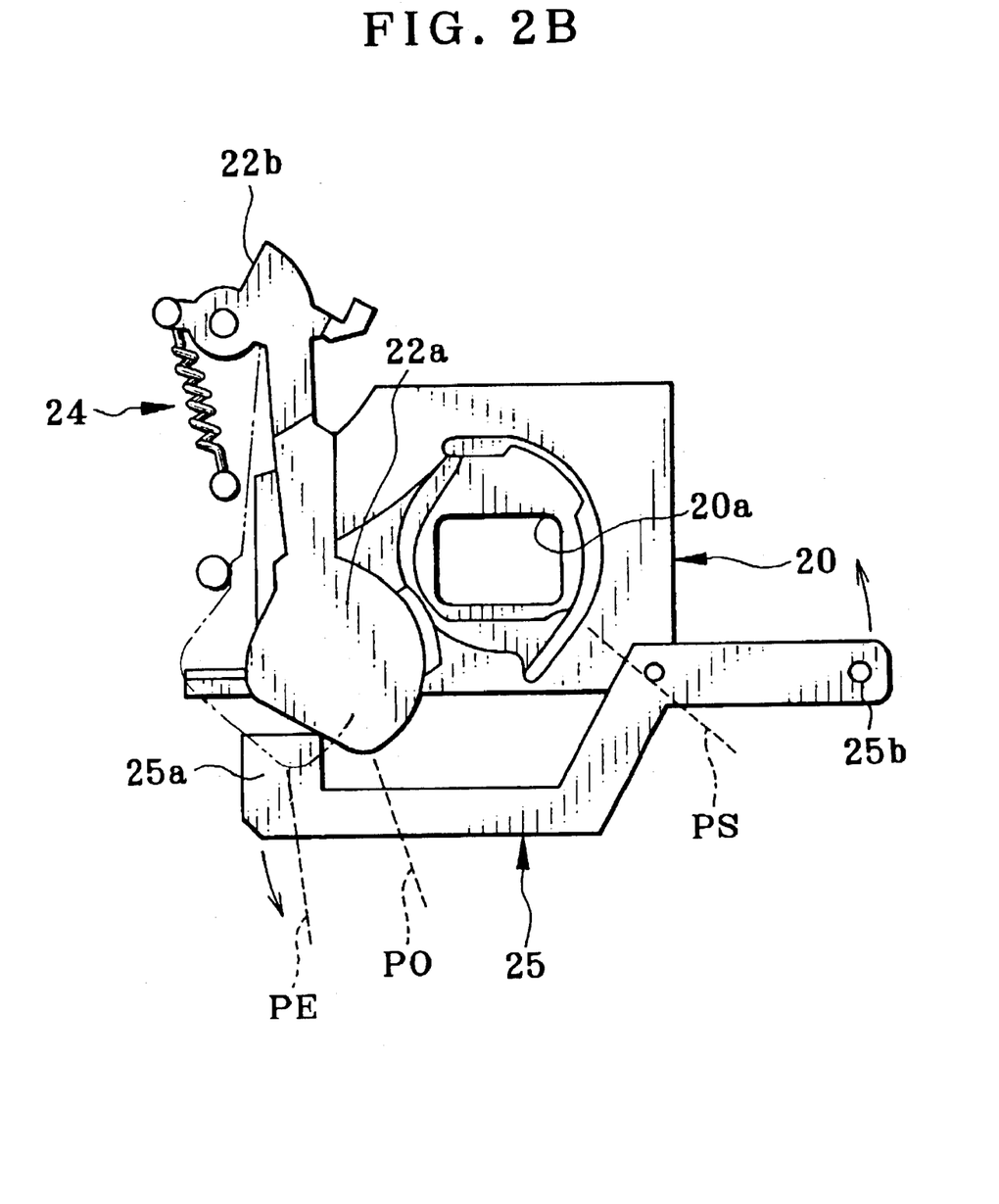
FIG. 2B is an explanatory view in front elevation, illustrating a movable stopper lever for changing over the shutter speed.

In FIG. 2, there is a light-shielded tunnel 20, which keeps a photographic light path shielded from ambient light between the taking lens 4 and the photo film 60. A shutter opening 20a is formed in a front panel of the light-shielded tunnel 20. A lens unit 23 and a shutter blade 22 of a shutter mechanism 21 are disposed in front of the shutter opening 20a. In FIG. 2B, the shutter blade 22 is supported on the front panel of the light-shielded tunnel 20 rotatably between a shut position PS, and a first open position PE that is an end position. When the shutter blade 22 is in the shut position PS, a blade portion 22a shuts the shutter opening 20a. When the shutter blade 22 is in a second open position PO that is between the shut position PS and the first open position PE, the blade portion 22a is offset from a position in front of the shutter opening 20a. A return spring 24 or tension coil spring biases the shutter blade 22 toward a shut position PS. The shutter blade 22 shuts the shutter opening 20a when in the shut position PS.

A shutter speed changing lever 25 or movable stopper lever is supported rotatably on a front panel of the shutter mechanism 21. The shutter speed changing lever 25 has a stopper projection 25a at a first end, and an end pin 25b at a second end. The shutter speed changing lever 25 is rotatable between an offset position and a blocking position, and when in the offset position, sets the stopper projection 25a away from a rotational orbit of the shutter blade 22, and when in the blocking position, causes the stopper projection 25a to extend into the rotational orbit of the shutter blade 22 between the second open position PO and the first open position PE.

A movable plate 27 is provided with the mode selector 8 as one piece, and slidable up and down. A fork portion 27a is formed on a lateral edge of the movable plate 27. The end pin 25b is engaged with the fork portion 27a. When the mode selector 8 is positioned for the AE mode, the shutter speed changing lever 25 is set in the blocking position. When the mode selector 8 is positioned for the night scene mode, the shutter speed changing lever 25 is set in the offset position.

The shutter mechanism 21 is actuated upon the lapse of a predetermined time after depression of the shutter release button 11. A shutter drive lever (not shown) as a part of the shutter mechanism 21 abruptly moves from a charged position to a released position. A driven portion 22b of the shutter blade 22 is quickly knocked by the shutter drive lever, to rotate the shutter blade 22 toward its first open position PE against the bias of the return spring 24. The shutter drive lever is set in the charged position upon winding of the photo film by one frame.

When the mode selector 8 is in the night scene position, the shutter speed changing lever 25 is in the offset position. The shutter blade 22 swings to the first open position PE, and after this, is swung back to the shut position PS by the bias of the return spring 24. When the mode selector 8 is in the AE position, the shutter speed changing lever 25 is in the blocking position. The shutter blade 22 contacts the stopper projection 25a without reaching the first open position PE, and is swung back to the shut position PS by the return spring 24. This being so, an effective angle of rotation of the shutter blade 22 is set smaller at the time of the AE mode to determine the first shutter speed that is relatively high, and is set greater at the time of the night scene mode to determine the second shutter speed that is relatively low.

The lens unit 23 in front of the light-shielded tunnel 20 is so disposed that the shutter blade 22 is located between the lens unit 23 and the light-shielded tunnel 20. The lens unit 23 includes the taking lens 4, a lens holder panel 30, a stationary aperture stop plate 31, a spacer 32, a small aperture stop plate 33, a middle aperture stop plate 34, and a lens fastener panel 35. The taking lens 4 includes a front lens element 4a and a rear lens element 4b. The stationary aperture stop plate 31, the small aperture stop plate 33 and the middle aperture stop plate 34 constitute an aperture stop device. A lens holder gap 30a is formed in the lens holder panel 30, and receives insertion of the rear lens element 4b, the stationary aperture stop plate 31, the spacer 32 and the front lens element 4a in sequence, which are kept positioned firmly by the lens fastener panel 35.

A large aperture stop opening 31a is formed in the stationary aperture stop plate 31. The spacer 32 keeps a space between the stationary aperture stop plate 31 and the front lens element 4a for movement of end portions of the small aperture stop plate 33 and the middle aperture stop plate 34. A small aperture stop opening 33a is formed in the end portion of the small aperture stop plate 33, and has an aperture diameter smaller than that of the large aperture stop opening 31a. In the middle aperture stop plate 34 is formed a middle aperture stop opening 34a, which has an aperture diameter smaller than that of the large aperture stop opening 31a but greater than that of the small aperture stop opening 33a.

Note that the disposition of the small and middle aperture stop openings 33a and 34a can be modified in any suitable manner. For example, the small aperture stop plate 33 and/or the middle aperture stop plate 34 may be disposed behind the rear lens element 4b of the taking lens 4. Also, the large aperture stop opening 31a may be formed directly in the lens holder panel 30 without using the stationary aperture stop plate 31.

A transmission lever 37 has a connection arm 37a to which the small aperture stop plate 33 is secured. A pivot 30b supports the small aperture stop plate 33 and the transmission lever 37 in a rotatable manner. The small aperture stop plate 33 is rotatable between internal and external positions, and when in the internal position, sets the small aperture stop opening 33a in the optical axis of the taking lens 4, and when in the external position, sets the small aperture stop opening 33a away from the optical axis of the taking lens 4. A torsion coil spring 38 biases the small aperture stop plate 33 and the transmission lever 37 toward the internal position.

A small aperture stop setting mechanism 40 includes a solenoid as actuator, moving elements, returning elements and the like. The solenoid is driven when the object brightness is lower then the reference brightness level. The moving elements are driven in response to the operation of the solenoid, rotate the transmission lever 37 and the small aperture stop plate 33 against the torsion coil spring 38, and retain the small aperture stop plate 33 in the external position. The returning elements are driven in response to feeding of the photo film by one frame after an exposure, for moving the small aperture stop plate 33 back to the internal position. Thus, the small aperture stop plate 33 is set by the small aperture stop setting mechanism 40 in the external position if the object brightness is lower than the reference brightness level. The small aperture stop plate 33 is set by the small aperture stop setting mechanism 40 in the internal position if the object brightness is equal to or higher than the reference brightness level.

A pivot 30c on the front panel of the lens holder panel 30 supports the middle aperture stop plate 34 having the middle aperture stop opening 34a. The middle aperture stop plate 34 is rotatable between the inner and outer positions, and when in the inner position, sets the middle aperture stop opening 34a in the optical axis of the taking lens 4, and when in the outer position, sets the middle aperture stop opening 34a away from the optical axis of the taking lens 4. A middle aperture stop transmission pin 27b projects from a front surface of the movable plate 27. A middle aperture stop transmission slot 34b is formed in the middle aperture stop plate 34, and receives the middle aperture stop transmission pin 27b and is engaged therewith. According to the engagement, the middle aperture stop plate 34 rotates upon sliding of the movable plate 27. When the mode selector 8 is set in the AE position, the middle aperture stop plate 34 is rotated to the inner position. When the mode selector 8 is set in the night scene position, the middle aperture stop plate 34 is rotated to the outer position.

According to this construction, the small aperture stop plate 33 is set in the internal position to position the small aperture stop opening 33a on the optical axis if the object brightness is equal to or higher than the reference brightness level irrespective of the AE mode and the night scene mode. The small aperture stop state is determined for taking an exposure. If the object brightness is lower than the reference brightness level at the time of AE mode, the small aperture stop plate 33 is set in the external position and the middle aperture stop plate 34 is set in the inner position. The middle aperture stop opening 34a on the optical axis is effective for an aperture stop, to determine the middle aperture stop state. If the object brightness is lower than the reference brightness level at the time of night scene mode, the small aperture stop plate 33 is set in the external position and the middle aperture stop plate 34 is set in the outer position. The large aperture stop opening 31a on the optical axis is effective for an aperture stop by offsetting the small and middle aperture stop openings 33a and 34a, to determine the large aperture stop state.

The movable plate 27 is slid up and down by manual operation of the mode selector 8. An ND filter 43 as light reducing filter for light amount selection is incorporated in an upper portion of the movable plate 27 for attenuating light incident thereon. The ND filter 43 operates for changing the flash light amount according to a difference between the f-numbers of the AE mode and the night scene mode in use of the flash adjusting mode. When the movable plate 27 slides, the ND filter 43 moves into or away from a space in front of the flash adjustment photo sensor 18. The ND filter 43, when the mode selector 8 is in the AE position, is in a first position and disposed in front of the flash adjustment photo sensor 18, and when the mode selector 8 is in the night scene position, is in a second position and disposed upwards away from the flash adjustment photo sensor 18.

A flash switch sliding plate 44 is disposed to support the flash button portion 9 formed thereon. The flash switch sliding plate 44 is slid up and down when the flash button portion 9 is manually slid. A pressing projection 44a projects from a rear of the flash switch sliding plate 44. A flash switch 45 is depressed and turned on by the pressing projection 44a when the flash button portion 9 is slid to the on position.

The flash switch 45 is a charger switch, and at the same time a flash emission switch. When the flash switch 45 is turned on, a main capacitor of the flash device is charged, and flash emission is allowed. When the flash switch 45 is turned off, charging of the main capacitor of the flash device is discontinued, and flash emission is inhibited.

The flash button portion 9 projects from the front of the flash switch sliding plate 44. A lock projection 27c projects from a lateral edge of the movable plate 27, and disposed at an end of a moving orbit of the flash button portion 9. When the mode selector 8 is slid to the night scene position, the lock projection 27c pushes up and sets the flash button portion 9 to the on position. When the flash button portion 9 is slid from the on position to the off position, the mode selector 8 is slid down to the AE position by the lock projection 27c.

Figure 3:
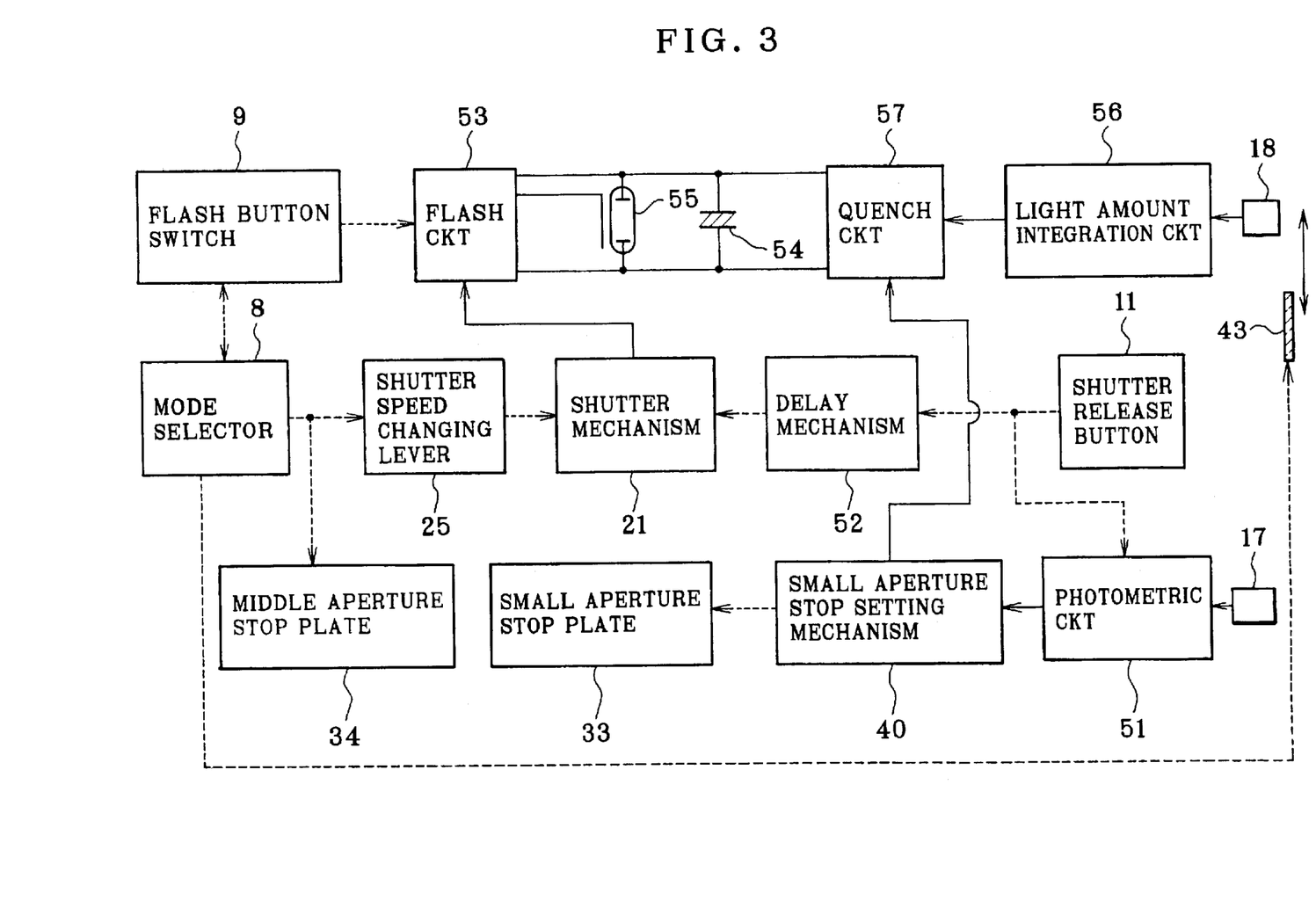
FIG. 3 is a block diagram illustrating circuits in the lens-fitted photo film unit.

In FIG. 3, relevant circuits in the lens-fitted photo film unit are illustrated. A photometric circuit 51 and a delay mechanism 52 are operated upon depression of the shutter release button 11.

The AE photo sensor 17 is connected with the photometric circuit 51. Preferred examples of the AE photo sensor 17 are a photo diode, a photo transistor, CdS and the like. The AE photo sensor 17 receives light from a photographic object, and causes a photoelectric current to flow at a level according to intensity of the received light, as a signal of the object brightness. The photometric circuit 51 compares the object brightness with the reference brightness level prede-termined suitably, and if the object brightness is lower, then sends a drive signal to the small aperture stop setting mechanism 40.

The small aperture stop setting mechanism 40, upon receiving a drive signal, rotates the small aperture stop plate 33 and keeps the same in the external position. When there is no drive signal, the small aperture stop setting mechanism 40 keeps the small aperture stop plate 33 in the internal position. There is a detection switch in the small aperture stop setting mechanism 40 for being turned on when the small aperture stop plate 33 is in the external position, and for being turned off when the small aperture stop plate 33 is in the internal position. The detection switch outputs a flash control signal according to turning on and off. The flash control signal is used for setting a selected one of the flash adjusting mode and the full flash emitting mode of the flash device.

The delay mechanism 52 determines a delay with which the actuation of the shutter blade 22 starts after the depression of the shutter release button 11 before changing over of the small aperture stop setting mechanism 40. When a predetermined time elapses after the depression of the shutter release button 11, the delay mechanism 52 actuates the shutter mechanism 21.

When the shutter blade 22 rotates and comes to the second open position PO, the shutter mechanism 21 generates a sync signal for flash emission. A sync switch is included in the shutter mechanism 21, disposed close to the shutter blade 22, depressed by a portion of the shutter blade 22 rotated to the second open position PO, and turned on to generate the sync signal.

As has been described heretofore, the shutter speed changing lever 25 and the middle aperture stop plate 34 are driven in response to shifting the mode selector 8. The shutter speed of the shutter mechanism 21 is changed over. The middle aperture stop opening 34a is moved into or away from the optical axis of the taking lens 4.

The flash device includes the flash button portion 9, the flash adjustment photo sensor 18, and also a flash circuit 53, a main capacitor 54, a flash discharge tube 55, a light amount integration circuit 56, a quench circuit 57 and a battery (not shown) as power source. The flash circuit 53 operates for charging and emitting flash. The light amount integration circuit 56 and the quench circuit 57 cooperate in the flash adjusting unit. The battery for the flash device also supplies the small aperture stop setting mechanism 40 and the photometric circuit 51 with power.

The flash circuit 53 includes the flash switch 45 which is turned on and off by shifting of the flash button portion 9. When the flash switch 45 is turned on, the flash circuit 53 charges the main capacitor 54 to a predetermined voltage. While the flash switch 45 is turned on, a trigger voltage is applied to the flash discharge tube 55 upon inputting of a sync signal from the shutter mechanism 21.

The flash discharge tube 55 is disposed inside the flash emitter 10. When the main capacitor 54 is readily charged, trigger voltage is applied to the flash discharge tube 55. The flash discharge tube 55 responsively emits flash light by discharging the main capacitor 54. The flash light from the flash discharge tube 55 is directed to a photographic object in a forward direction from the flash emitter 10.

The flash adjustment photo sensor 18 is a photoreceptor with a characteristic of a quick response, and can be a photo transistor. The flash adjustment photo sensor 18 receives reflected flash light from a photographic object through the flash adjustment window 7, and causes a photoelectric current to flow according to the intensity of the reflected flash light. The light amount integration circuit 56 is supplied with the photoelectric current, obtains a light amount of the reflected flash light according to integration, and outputs a quench signal when the integrated light amount comes up to a predetermined limit level for the quench. The quench signal is sent to the quench circuit 57.

The quench circuit 57 is constituted by a number of circuit elements including a thyristor, which is turned on in response to a quench signal. The quench circuit 57 is connected with the small aperture stop setting mechanism 40. When the detection switch in the small aperture stop setting mechanism 40 is turned on, the quench signal causes the quench circuit 57 to discharge the main capacitor 54 in place of the path through the flash discharge tube 55, so as to quench the flash emission. If the detection switch in the small aperture stop setting mechanism 40 is turned off, the quench circuit 57 allows flash emission without the quench irrespective of inputting of the quench signal. Thus, the full flash emitting mode is set by the quench circuit 57 if the small aperture stop state is set according to high object brightness relative to the reference brightness level. The flash adjusting mode is set by the quench circuit 57 if the middle or large aperture stop state is set according to low object brightness relative to the reference brightness level.

If flash emission is desired at the time of the high brightness, it is likely that a scene is a rear light scene. This is daylight synchronized flash photography. It is desirable that flash light at a sufficient amount should be applied to a less bright principal object in front of a background image having high brightness. If the flash adjustment is effective, it is likely that the flash adjustment photo sensor 18 receives too much light reflected by the background. The correction of the rear light scene is likely to be insufficient, because no sufficient flash light may be applied to the principal object in view of the contrast with the background. To prevent such difficulties, the full flash emitting mode in place of the flash adjusting mode is forcibly designated when the object brightness is equal to or higher than the reference brightness level. Sufficient flash light is applied to a principal object by canceling the flash adjusting mode.

When the mode selector 8 is set in the AE position, the ND filter 43 is inserted into the space in front of the flash adjustment photo sensor 18, as described above. The reflected flash light is weakened at the time of incidence upon the flash adjustment photo sensor 18 in comparison with the state while the ND filter 43 is away from the flash adjustment photo sensor 18. As a result, an amount of flash light emitted between the quench is set higher. Therefore, the flash light amount is higher when the middle aperture stop opening 34a is used than when the large aperture stop opening 31a is used, which is in consideration of a smaller aperture diameter of the middle aperture stop opening 34a. In any of those states, an exposure amount obtained in the use of the flash adjusting mode is optimized by suitably predetermining the limit light amount level of the quench, optical transmittance of the ND filter 43 and the like. It is to be noted that, in the present invention, the limit light amount level of the quench may be changed over between high and low values by a suitable control in circuits without changing the intensity of the received flash light.

The following table indicates combinations of the aperture stop, the shutter speed, and the selection of the flash adjusting mode and the full flash emitting mode, which are determined for the object brightness and the selection of the AE mode and the night scene mode.

|  | Object Brightness | Aperture Stop | Shutter Speed | Modes Of Flash |
|---|---|---|---|---|
| Night Scene Mode | Low Brightness | f/5.6 | 1/45 sec. | Flash Adjusting Mode |
|  | High Brightness | f/26 | 1/45 sec. | Full Flash Emitting Mode |
| AE Mode | Low Brightness | f/8 | 1/85 sec. | Flash Adjusting Mode |
|  | High Brightness | f/26 | 1/85 sec. | Full Flash Emitting Mode |

The high, first shutter speed is 1/85 second. The low, second shutter speed is 1/45 second. The large aperture stop state is set to have the f-number of f/5.6. The middle aperture stop state is set to have the f-number of f/8. The small aperture stop state is set to have the f-number of f/26. The photo film has photo film speed of ISO 3200. The latitude of the photo film is in a range from −1.5 EV to +4.5 EV. Those are considered in determining the shutter speed and the aperture stop.

Figure 4:
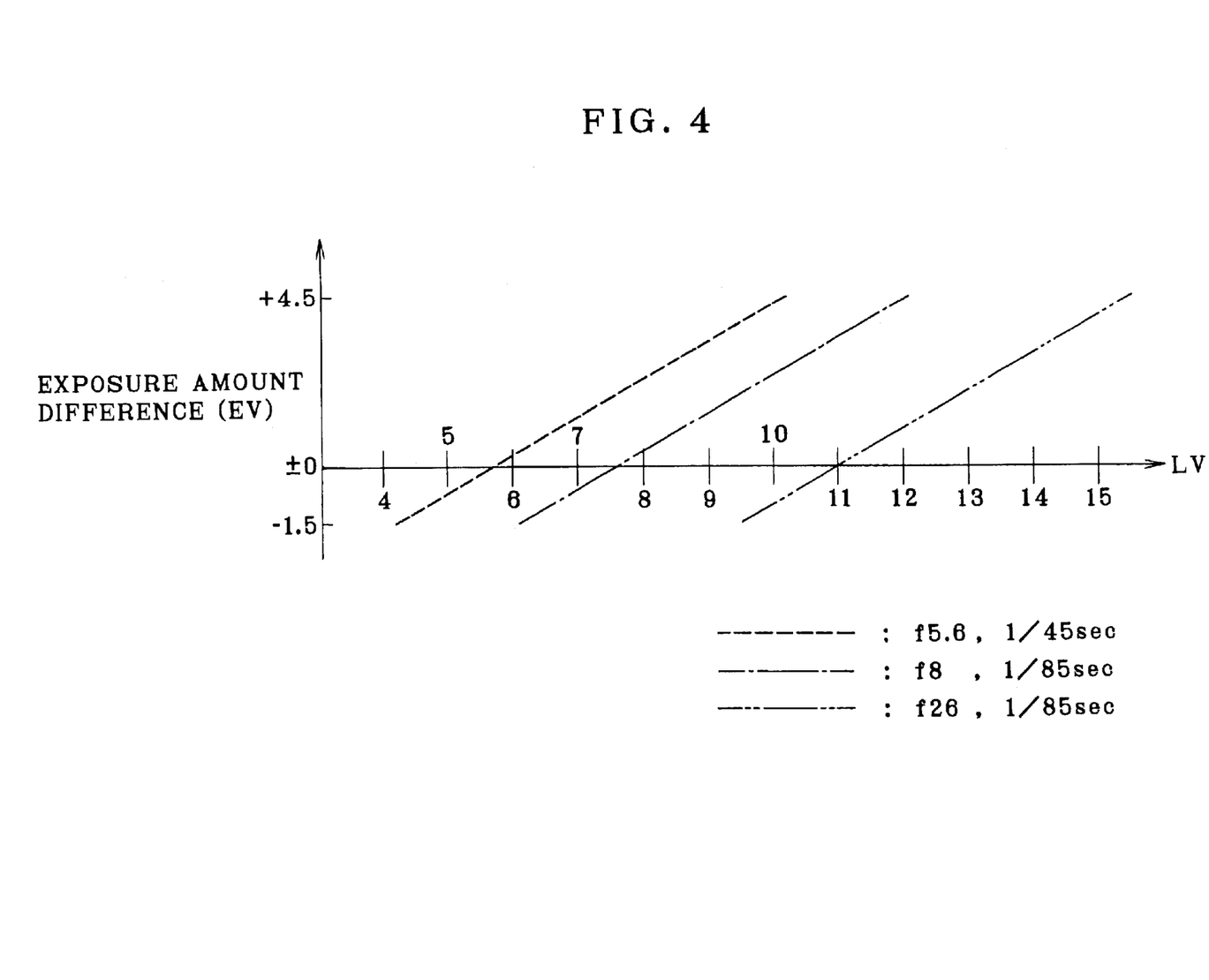
FIG. 4 is a graph illustrating ranges of the object brightness at which photographing is possible in consideration of the latitude of the photo film, in relation to three combinations of the aperture stop and shutter speeds.

FIG. 4 illustrates ranges of the object brightness at which photographing is possible in consideration of the latitude of the photo film, in relation to three modes which are the low-brightness AE mode, high-brightness AE mode, and low-brightness night scene mode. In the low-brightness AE mode, the high, first shutter speed of 1/85 second, and the middle aperture stop state of f/8 are used. In the high-brightness AE mode, the high, first shutter speed of 1/85 second, and the small aperture stop state of f/26 are used. In the low-brightness night scene mode, the low, second shutter speed of 1/45 second, and the large aperture stop state of f/5.6 are used.

Note that an LV value is used to represent the object brightness. The LV value represents brightness of the object in a similar manner to an APEX (Additive System of Photographic Exposure) value, and is defined by use of $\log_2$ (photo film speed/100) as a value corresponding to the ISO photo film speed. According to the APEX value, an SV value for the photo film speed is "$\log_2$ (0.32×photo film speed)". Between the BV value in the APEX expression and the LV value, there is a relationship of:

$$LV-BV=\text{Constant } (\approx 5.0)$$

To obtain the LV value, a T-number is used, which is defined by considering the f-number and the transmittance of the taking lens 4.

In the low-brightness AE mode, the exposure is optimized when the object brightness is 7.6 LV. In consideration of the latitude of the photo film, it is possible acceptably to take a photograph when the brightness is in a range of 6.1–12.1 LV. In the high-brightness AE mode, the exposure is optimized when the object brightness is 11.0 LV. In consideration of the latitude of the photo film, it is possible acceptably to take a photograph when the object brightness is in a range of 9.5–15.5 LV.

In the normal night scene mode, the exposure is optimized when the object brightness is 5.7 LV. In consideration of the latitude of the photo film, it is possible acceptably to take a photograph when the object brightness is in a range of 4.2–10.2 LV.

It is, therefore, possible in the lens-fitted photo film unit to take a photograph in a wide range of the brightness of 4.2–15.5 LV with acceptable high quality. This brightness range is considerably wide and can cover numerous kinds of practically photographed scenes at a very high frequency, because the brightness range includes an indoor scene of a party room or a wedding room with weak ambient light, and an outdoor scene of a skiing ground under a clear sky of a sunny weather with illuminating light of a great amount. Furthermore, the brightness range of the night scene mode without problems in practical use is overlapped with the brightness range of the low-brightness AE mode. A photograph can be taken acceptably no matter which of the night scene mode and the low-brightness AE mode is selected for a scene of weak ambient light.

Note that the reference brightness level used in the AE mode for switching is determined in a middle of a brightness range where an acceptable brightness range used in the low-brightness AE mode is overlapped with an acceptable brightness range used in the high-brightness AE mode. However, it is preferable that the reference brightness level should be higher than a mean value of the overlapping range of the acceptable brightness ranges.

The operation of the above embodiment is described now. To take a photograph, a user rotates the winder wheel 14 at first, to wind the photo film by an amount of one frame. In response to this, the shutter device is charged. Also, the mode selector 8 is manually operated according to a scene to be photographed, to set a selected one of the AE mode and the night scene mode.

It is sufficient for a user to select one of the AE mode and the night scene mode according to the object brightness. The acceptable brightness range of the normal night scene mode is overlapped in a sufficient width with the acceptable brightness range of the low-brightness AE mode. It is possible and safe to select either of the normal night scene mode and the low-brightness AE mode specifically when an illuminating light amount is relatively low. The night scene mode can be effective if a user feels significantly low light amount but not darkness, and also if a user feels extremely low light amount nearly in the darkness. It follows that a user can take a photograph readily only after limited estimation.

To set the AE mode, the mode selector 8 is slid down and kept in the AE position. After this, the flash button portion 9 is slid to turn on or off of the flash emission. If the mode selector 8 is incidentally in the night position and if no flash emission is intended, it may be possible to slide the flash button portion 9 to the off position from the on position according to the night scene mode. When the flash button portion 9 is slid to the off position, the movable plate 27 is slid down because the lock projection 27c is pushed by the lower end of the flash button portion 9. The mode selector 8 is set in the AE position.

Therefore, shifting of the flash button portion 9 to the off position changes over from the night scene mode to the AE mode. It is possible to prevent errors in manual operation, because turning off of the flash device cannot be simultaneous with the night scene mode.

The mode selector 8 being kept in the AE position, the sliding of the movable plate 27 causes the shutter speed changing lever 25 to rotate to the blocking position. The shutter speed changing lever 25 is kept in this position. The stopper projection 25a becomes disposed to extend into a rotational orbit of the shutter blade 22. The middle aperture stop plate 34 rotates to, and kept in, the inner position. Accordingly, the large aperture stop opening 31a of the stationary aperture stop plate 31, the middle aperture stop opening 34a of the middle aperture stop plate 34 and the small aperture stop opening 33a of the small aperture stop plate 33 are positioned on the optical axis of the taking lens 4. Also, the ND filter 43 is moved to the insertion position to weaken the light incident upon the flash adjustment photo sensor 18.

When the flash button portion 9 is slid to the on position, the flash switch 45 is turned on. The flash circuit 53 is caused to charge the main capacitor 54, to stand by for flash emission. The ready state after charging the main capacitor 54 is indicated by the standby indicator 13.

The user observes a photographic field through the viewfinder 5, and depresses the shutter release button 11 after framing, to take an exposure. The depression of the shutter release button 11 starts actuating the delay mechanism 52, and also operates the photometric circuit 51. A photoelectric current flows from the AE photo sensor 17 at a level according to the object brightness. The photometric circuit 51 compares the object brightness with a reference brightness level according to the photoelectric current from the AE photo sensor 17.

If the object brightness is equal to or higher than the reference brightness level, no drive signal is sent by the photometric circuit 51 to the small aperture stop setting mechanism 40. The small aperture stop plate 33 is kept positioned in the internal position by the small aperture stop setting mechanism 40. A position switch included in the small aperture stop setting mechanism 40 remains turned off because the small aperture stop plate 33 is in the internal position. Information of the turning off of the position switch is sent to the quench circuit 57 as flash control signal. Even if a quench signal is input, there occurs no quench of flash emission in the quench circuit 57. This is the full flash emitting mode without the flash adjustment.

After depressing the shutter release button 11, time required for changing over of the aperture stop at the small aperture stop setting mechanism 40 passes. After this, the delay mechanism 52 actuates the shutter mechanism 21. A shutter drive lever instantaneously knocks the shutter blade 22, which starts rotation from the shut position PS toward the first open position PE. As the stopper projection 25a of the shutter speed changing lever 25 is disposed to extend into a rotational orbit of the shutter blade 22, the shutter blade 22 which rotates opens the shutter opening 20a fully, and then contacts the stopper projection 25a before reaching the first open position PE. The bias of the return spring 24 causes the shutter blade 22 to rotate back to the shut position PS. Consequently, the shutter blade 22 is opened and shut at the high, first shutter speed.

When the shutter blade 22 reaches the second open position PO to open the shutter opening 20a fully, instantaneously a sync signal is sent by the shutter mechanism 21 to the flash circuit 53. The flash button portion 9 being set in the on position, the flash circuit 53 applies a trigger voltage to the flash discharge tube 55 in response to the sync signal. Thus, flash light is emitted. The flash light emitted by the flash discharge tube 55 is directed to a photographic object from the flash emitter 10.

The light amount integration circuit 56 in the flash device obtains the light amount of reflected flash light by integration. However, the quench of the flash emission is canceled because the full flash emitting mode is set. The flash emission is continued until the voltage across the main capacitor 54 in parallel with the flash discharge tube 55 becomes lower than a voltage level for continuing the discharge. Flash light at a constant level is emitted toward a photographic object.

The photo film is exposed through the small aperture stop opening 33a, the middle aperture stop opening 34a, and the large aperture stop opening 31a by the object light incident upon the taking lens 4 while the shutter blade 22 opens at the first shutter speed, which is irrespective of use or lack of the flash emission. The effective aperture stop is defined by the small aperture stop opening 33a. Thus, the small aperture stop state and the high, first shutter speed are used in combination for the exposure. It is possible to photograph an object in a brightness range of 9.5–15.5 LV.

When the object brightness is lower than the reference brightness level, the photometric circuit 51 sends a drive signal to the small aperture stop setting mechanism 40, which rotates the small aperture stop plate 33 from the internal position to the external position. The small aperture stop plate 33 becomes kept in the external position. The small aperture stop opening 33a is shifted away from the optical axis of the taking lens 4. So the middle aperture stop opening 34a remains positioned, and defines the middle aperture stop state to restrict an amount of the incident light for exposure.

The position switch in the small aperture stop setting mechanism 40 is turned on by rotation of the small aperture stop plate 33 to the external position. The information of turning on is sent to the quench circuit 57 in the form of the flash control signal. The flash adjusting mode is set for the flash device in which the quench circuit 57 quenches the flash emission upon receiving the quench signal.

After changing over the aperture stop according to the object brightness, the delay mechanism 52 actuates the shutter mechanism 21. The shutter blade 22 is opened and shut at the high, first shutter speed in a manner similar to a scene with the object brightness equal to or higher than the reference brightness level. When the shutter blade 22 reaches the second open position PO, a sync signal is sent to the flash circuit 53.

If the flash button portion 9 is in the on position, flash emission is started in response to the sync signal. Flash light is emitted toward a photographic object by the flash emitter 10. The object reflects the flash light, part of which comes incident upon the flash adjustment photo sensor 18. According to the intensity of the incident reflected flash light, a photoelectric current flows from the flash adjustment photo sensor 18. As the ND filter 43 is in the insertion position, the reflected flash light incident upon the flash adjustment photo sensor 18 is weakened. The photoelectric current flows at a reduced level.

The light amount integration circuit 56 obtains an integrated light amount of reflected flash light according to a photoelectric current flowing from the flash adjustment photo sensor 18. When the integrated light amount comes up to a predetermined limit light amount level, a quench signal is sent to the quench circuit 57. Turning on of the detection switch is input as a flash control signal. The quench circuit 57 quenches the flash emission exactly upon the inputting of the quench signal. So the quenching of the flash emission is effected when the integrated light amount comes up to the middle light amount level, at which an exposure of the photo film is optimized in using the middle aperture stop state. The flash emission is controlled in this manner. The photo film is exposed in fully opening the shutter opening 20a with light from object illuminated by the flash light.

Thus, the middle aperture stop state and the high, first shutter speed are used in combination for the object brightness lower than the reference brightness level. It is possible to photograph an object in a brightness range of 6.1–12.1 LV. Flash light, when used, is automatically adjusted at an optimum light amount level in view of the middle aperture stop state.

In contrast, the mode selector 8 is set in the night scene position to select the night scene mode if a user wishes to photograph an object such as a night scene which has very weak ambient light, a principal object of a human being in front of a background object of a night scene, a principal object of a human being in front of a background object of the inside of a room but in consideration of reproducing the principal object at a suitable density, and the like.

When the mode selector 8 is set in the night scene position, the lock projection 27c pushes up the flash button portion 9 to the on position. It is unnecessary for a user to slide the flash button portion 9 when the night scene mode is selected. No judgement of turning on or off the flash emission is required. As a result, the mechanical structure is both simplified and useful in view of reliable and easy manual handling.

As the mode selector 8 is set in the night scene position, the shutter speed changing lever 25 is rotated to and kept in the offset position. The stopper projection 25a is disposed outside the rotational orbit of the shutter blade 22. The middle aperture stop plate 34 is rotated to and kept in the outer position. The stationary aperture stop plate 31 and the small aperture stop opening 33a are positioned on the optical axis of the taking lens 4. The ND filter 43 is shifted away from the front of the flash adjustment photo sensor 18. As the flash button portion 9 comes to the on position, the flash switch 45 is turned on. The main capacitor 54 is charged. The flash device is allowed to be ready to emit flash.

When the shutter release button 11 is depressed, the photometric circuit 51 and the delay mechanism 52 start operation. The AE photo sensor 17 receives object light. The photometric circuit 51 evaluates the object brightness according to comparison with the reference brightness level.

If the object brightness is lower than the reference brightness level, the small aperture stop setting mechanism 40 sets the small aperture stop plate 33 in the external position in a manner similar to the AE mode. The flash device is set in the flash adjusting mode. If the object brightness is equal to or higher than the reference brightness level, the small aperture stop setting mechanism 40 sets the small aperture stop plate 33 in the internal position. The flash device is set in the full flash emitting mode.

If a photographic object is located in a room with weak ambient light and if the object brightness is lower than the reference brightness level, then the small aperture stop plate 33 is in the external position. The small and middle aperture stop openings 33a and 34a are offset from the optical axis of the taking lens 4. After this, the shutter mechanism 21 is actuated by the delay mechanism 52, to open and shut the shutter blade 22. The shutter speed changing lever 25 is in the offset position as the night scene mode is determined. The shutter blade 22 rotates from the shut position PS to the first open position PE, and is rotated back to the shut position PS by the return spring 24. The low, second shutter speed is used in combination with the large aperture stop state in contrast with the high, first shutter speed in the AE mode.

Flash light is emitted when the shutter blade 22 reaches the second open position PO in the manner similar to the low-brightness AE mode. When the integrated light amount comes up to the predetermined limit level, the quench circuit 57 quenches the flash emission. As the ND filter 43 is positioned away from the flash adjustment photo sensor 18, the adjusted flash light amount in the small aperture stop state is smaller than that in the middle aperture stop state. Thus, the flash light amount is restricted at an optimized light amount level.

In the exposure of the night scene mode, a principal object at a relatively near distance can be illuminated adequately by the adjusted flash light. A background object can be acceptably photographed by means of the low, second shutter speed and the large aperture stop state, even though not illuminated by the flash light due to the far distance. The brightness range of 4.2–10.2 LV is wide enough for optimally taking an exposure in the night scene mode.

When the high-brightness night scene mode is determined, the low, second shutter speed is used in combination with the small aperture stop state. Thus, an exposure can be taken safely with acceptable quality if the night scene mode is erroneously selected for a high-brightness scene for which the AE mode would be suitable.

In the above embodiment, the automatic flash adjustment is used at the time of the low brightness. The full emission of flash light is used at the time of high brightness. However, the automatic flash adjustment may be used at the time of the high brightness. Also, the full emission of flash light may be used at the time of low brightness. The various specific values of the aperture stop states, shutter speeds and the like have been described simply as examples, and can be determined in any suitable manner according to various factors including the speed of the photo film and the like.

In the above embodiment, the small aperture stop opening 33a in the small aperture stop plate 33 and the middle aperture stop opening 34a in the middle aperture stop plate 34 are selectively set in the optical axis. However, a single movable aperture stop plate may be used, and can have the small and middle aperture stop openings 33a and 34a. The movable aperture stop plate may be driven by a suitable moving mechanism, and shiftable in first, second and third positions. The movable aperture stop plate, when in the first position, may set the small aperture stop opening 33a in the optical axis to define the small aperture state, and when in the second position, may set the middle aperture stop opening 34a in the optical axis to define the middle aperture state, and when in the third position, becomes offset from the optical axis to define the large aperture state. For such a construction, the mode selector may have an electrical structure for generating signals representing the AE mode and the night scene mode.

In the above embodiment, the photo film is an ultra-high speed photo film of ISO 3200. However, the photo film may have speed of ISO 1600 or lower. If the photo film speed is as low as ISO 800 or 400, it is desirable to determine the shutter speed lower than that of the above embodiment. However, the photo film speed as high as ISO 3200 or 1600 is preferable, because the shutter speed can be high enough to prevent a camera shake in manual holding of a user's hands.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film, comprising:
    a photometric circuit for measuring object brightness of a photographic object, and for determining which of high brightness and low brightness said object brightness is according to comparison with a predetermined reference brightness level;
    an aperture stop device for changing over a photographic light path in a selected one of a small aperture stop state, a middle aperture stop state, and a large aperture stop state, said middle aperture stop state having a greater aperture diameter than said small aperture stop state, said large aperture stop state having a greater aperture diameter than said middle aperture stop state;
    a flash device for applying flash light to said object for flash photography;
    a mode selector for selectively determining one of an AE mode and a night scene mode;
    wherein said aperture stop device sets said small aperture stop state when said AE mode is determined and also when said object brightness is said high brightness, sets said middle aperture stop state when said AE mode is determined and also when said object brightness is said low brightness, and sets said large aperture stop state when said night scene mode is determined, in which said flash photography is carried out with said flash device.

2. A lens-fitted photo film unit as defined in claim 1, further comprising:
    a shutter mechanism for providing said photo film with an exposure by opening and shutting said light path;
    a shutter speed changer for setting said shutter mechanism at a high shutter speed when said AE mode is determined, and for setting said shutter mechanism at a low shutter speed when said night scene mode is determined.

3. A lens-fitted photo film unit as defined in claim 2, wherein said aperture stop device includes:
    a stationary aperture stop plate, disposed in said light path, having a large aperture stop opening, for defining said large aperture stop state;
    at least one movable aperture stop plate, having a middle aperture stop opening and a small aperture stop opening, said middle aperture stop opening being smaller than said large aperture stop opening, said small aperture stop opening being smaller than said middle aperture stop opening, wherein said movable aperture stop plate defines said large aperture stop state when set away from said light path, and said middle and small aperture stop openings define respectively said middle and small aperture stop states when set in said light path.

4. A lens-fitted photo film unit as defined in claim 3, wherein said aperture stop device sets said small aperture stop state instead of said large aperture stop state when said night scene mode is determined and also when said object brightness is said high brightness.

5. A lens-fitted photo film unit as defined in claim 3, further comprising:
    a flash switch, externally operable, for enabling said flash device when in an on position, and for disabling said flash device when in an off position; and
    a lock mechanism, actuated when said night scene mode is determined, for keeping said flash switch in said on position by locking.

6. A lens-fitted photo film unit as defined in claim 5, wherein said at least one movable aperture stop plate comprises:
    a middle aperture stop plate, having said middle aperture stop opening, movable between first and second positions, wherein said middle aperture stop plate, when in said first position, defines said middle aperture stop state, and when in said second position, is away from said light path; and
    a small aperture stop plate, having said small aperture stop opening, movable between third and fourth positions, wherein said small aperture stop plate, when in said third position, defines said small aperture stop state, and when in said fourth position, is away from said light path.

7. A lens-fitted photo film unit as defined in claim 6, further comprising a flash adjusting unit for changing over flash light of said flash device at a selected one of at least a high light amount, a middle light amount and a low light amount, said high light amount being obtained by full flash emission of said flash device, said middle and low light amounts being obtained by restricting flash emission of said flash device according to reflected flash light from said object.

8. A lens-fitted photo film unit as defined in claim 7, wherein said AE mode and said night scene mode are determined by shifting said mode selector in respectively said AE position and said night scene position;
   said aperture stop device further includes:
      a middle aperture stop transmission mechanism for shifting said middle aperture stop plate to said first position when said mode selector is in said AE position, and for shifting said middle aperture stop plate to said second position when said mode selector is in said night scene position;
      a small aperture stop setting mechanism for shifting said small aperture stop plate to said third position when said object brightness is said high brightness, and for shifting said small aperture stop plate to said fourth position when said object brightness is said low brightness.

9. A lens-fitted photo film unit as defined in claim 8, wherein said small aperture stop setting mechanism includes an actuator.

10. A lens-fitted photo film unit as defined in claim 7, wherein said flash switch is provided with a flash button portion movable between said on and off positions;
   wherein said mode selector includes a mode button portion movable on an orbit extending along a moving orbit of said flash button portion, and movable between an AE position representing said AE mode and a night scene position representing said night scene mode;
   said lock mechanism is a lock projection, disposed to project from said mode button portion, for retaining an end part of said flash button portion near to said off position when said mode button portion is set in said night scene position, to set said flash button portion forcibly in said on position, said flash button portion being inhibited from coming back to said off position.

11. A lens-fitted photo film unit as defined in claim 7, wherein said flash adjusting unit determines said high light amount when said small aperture stop state is set, determines said middle light amount when said middle aperture stop state is set, and determines said low light amount when said large aperture stop state is set, so as to prevent overexposure in said middle and large aperture stop states.

12. A lens-fitted photo film unit as defined in claim 11, wherein said flash adjusting unit includes:
   a flash adjustment photo sensor for detecting said reflected flash light from said object;

a light amount integration circuit for obtaining an integrated light amount by integration of a signal of said reflected flash light; and a quench circuit, enabled in response to a signal of said low brightness from said photometric circuit, for quenching said flash emission of said flash device when said integrated light amount comes up to a reference value of said middle or low light amount, said quench circuit being disabled in response to a signal of said high brightness from said photometric circuit, to determine said high light amount.

13. A lens-fitted photo film unit as defined in claim 12, wherein said flash adjusting unit further includes a light amount selector, shifted by changing over of said mode selector, for selecting said low light amount when said night scene mode is determined, and for selecting said middle light amount when said AE mode is determined.

14. A lens-fitted photo film unit as defined in claim 13, wherein said light amount selector includes a light reducing filter, offset from said light adjustment photo sensor when said night scene mode is determined, and set in front of said light adjustment photo sensor when said AE mode is determined, for weakening said reflected flash light incident on said light adjustment photo sensor.

15. A lens-fitted photo film unit as defined in claim 14, wherein said mode selector has a movable plate, and said light reducing filter is secured fixedly on said movable plate.

16. A lens-fitted photo film unit as defined in claim 7, wherein said shutter mechanism includes:
   a shutter opening for defining said light path;
   a shutter blade, movable pivotally in a shut position and first and second open positions, for shutting said shutter opening when in said shut position, and for opening said shutter opening when in said first and second open positions, said second open position being disposed between said shut position and said first open position;
   a shutter blade driving unit for moving said shutter blade pivotally from said shut position toward said first open position, and then back to said shut position;
   said shutter speed changer includes:
      a movable stopper, movable between an offset position and a blocking position, set away from said moving path of said shutter blade when in said offset position, for enabling said shutter blade to reach said first open position, to determine said low shutter sped, said movable stopper extending into said moving path of said shutter blade when in said blocking position, for disabling said shutter blade from moving beyond said second open position toward said first open position, to determine said high shutter speed by shortening time for backward movement; and
      a transmission mechanism for setting said movable stopper in said offset position when said night scene mode is determined in said mode selector, and for setting said movable stopper in said blocking position when said AE mode is determined.

* * * * *